United States Patent [19]

Schriber et al.

[11] 4,169,246

[45] Sep. 25, 1979

[54] DIGITAL CARRIER CORRECTION CIRCUIT

[75] Inventors: Gene A. Schriber, Austin, Tex.; Harold G. Nash, Tempe, Ariz.

[73] Assignee: Motorola, Inc., Schaumburg, Ill.

[21] Appl. No.: 748,028

[22] Filed: Dec. 6, 1976

[51] Int. Cl.$^2$ .............................................. H04B 1/16
[52] U.S. Cl. ........................... 325/320; 340/146.1 D; 178/88; 178/67
[58] Field of Search ................... 325/30, 63, 320, 423, 325/344, 347, 349; 178/67, 69.1, 88; 340/146.1 D

[56] References Cited

U.S. PATENT DOCUMENTS

| | | | |
|---|---|---|---|
| 3,818,346 | 6/1974 | Fletcher | 325/320 |
| 3,878,334 | 4/1975 | Halpern | 178/69.1 |
| 3,883,806 | 5/1975 | DeLong | 325/320 |
| 3,936,762 | 2/1976 | Cox | 325/320 |
| 3,943,285 | 3/1976 | Ragsdale | 178/67 |
| 4,010,323 | 3/1977 | Peck | 325/320 |
| 4,011,407 | 3/1977 | DiSanti | 325/320 |

*Primary Examiner*—Robert L. Griffin
*Assistant Examiner*—Michael A. Masinick
*Attorney, Agent, or Firm*—Anthony J. Sarli, Jr.

[57] ABSTRACT

A carrier correction circuit accepts a serial digital data input stream having an underlying carrier frequency associated with it and generates a corrected carrier signal synchronized with the underlying carrier frequency. The input stream may, for example, be a serial output of an analog-to-digital converter having a differential phase shift keyed analog signal applied to its analog input, the underlying carrier frequency being the carrier frequency of the DPSK signal. The carrier correction circuit includes a phase detector which receives the serial digital data input stream and two representations of the recovered carrier which are shifted in phase from each other by 90°. Each of these representations of the recovered carrier is mixed with the serial digital data input stream by means of first and second mixer circuits, and the results are loaded into first and second serial accumulators, which accumulate, respectively, the average products of the two mixer circuits over a certain time period. A magnitude comparator periodically generates an error signal by comparing the magnitudes of the first and second serial accumulators. The carrier correction circuit includes a carrier correction filter which includes an up/down counter which counts up each time the error signal is a "1" and counts down each time it is a "0". The contents of the up-down counter are averaged to generate a number of correction pulses. A digital controlled oscillator accepts a sign bit and the correction pulses from the carrier correction filter in order to advance or retard the recovered carrier signal to synchronize it with the underlying carrier frequency.

7 Claims, 6 Drawing Figures

DIGITAL CARRIER CORRECTION CIRCUIT

BACKGROUND OF THE INVENTION

1. Field of the Invention

The invention relates to circuits for generating a so-called recovered carrier associated with a stream of digital data, and generating correction signals which are utilized to cause the recovered carrier to be synchronized with the carrier frequency.

2. Brief Description of the Prior Art

There are numerous applications in which serial digital input data, in the form of a data input stream, has an underlying carrier frequency associated with it. For example, DPSK (differential phase shift keyed) modem demodulators receive an analog DPSK signal over a telephone line, and then feed that signal into an analog-to-digital converter, which provides as an output a serial digital data stream as an input to other modem demodulator circuitry. In order to suitably process the various signals within the DPSK demodulator, it is necessary to have signals (which can be called recovered carrier signals) which are synchronized with the underlying carrier frequency associated with the serial digital DPSK data stream. Similarly, any digital circuit which receives a digital data stream input having an underlying carrier frequency may need a means of producing a synchronized recovered carrier signal. Another example is a PSK (phase shift keyed) system, wherein the PSK waveform is inputted to an A/D converter; the digital output, if it is in serial form, will have an underlying carrier frequency, which may need to be recovered. Prior approaches to generating such a recovered carrier signal have utilized a voltage controlled oscillator (voltage controlled oscillators are well known in the art) in conjunction with linear filters, active filters, and other analog circuits which generate linear or analog signals which are utilized as voltage control inputs to the voltage controlled oscillator. The output of the voltage controlled oscillator is conventionally compared with an incoming signal by means of a phase detector, which generates a signal indicative of whether an advancing or retardation of the recovered carrier signal is required to synchronize it with the underlying carrier. This error signal is applied to the above mentioned linear type of filter. Such prior art devices which require linear filters, summing amplifiers, etc. which utilize linear circuitry have not been capable of integration on a single LSI (large scale integrated) chip. Also, such linear circuits have time drift which are typical of R, L, and C components. Consequently, periodic calibration is required.

SUMMARY OF THE INVENTION

It is an object of the invention to provide a carrier correction circuit capable of producing a recovered carrier signal by comparing a serial digital data stream with the recovered carrier signal and advancing or retarding the recovered carrier signal to bring it into synchronization with an underlying carrier frequency of the serial digital data stream.

Briefly described, the invention is a carrier correction circuit for producing recovered carrier signals from an input signal. The carrier correction circuit includes first means responsive to the input signal and to the recovered carrier signal for producing an error signal indicative of whether the recovered carrier signal needs to be retarded or advanced in order to synchronize it with the input signal. The carrier correction circuit also includes second means responsive to the error signal cumulatively counting a number of advance and retard pulses of the error signal and dividing the net number of advance and retard pulses by an averaging factor to provide an average error signal representative of the magnitude of required correction to the recovered carrier signal and also for producing a direction signal indicative of whether the required carrier should be advanced or retarded. The carrier correction circuit also includes third means responsive to the average error signal and the direction signal for advancing and retarding the recovered carrier signal in response to the average error signal and the direction signal.

DESCRIPTION OF THE INVENTION

Figure 1:
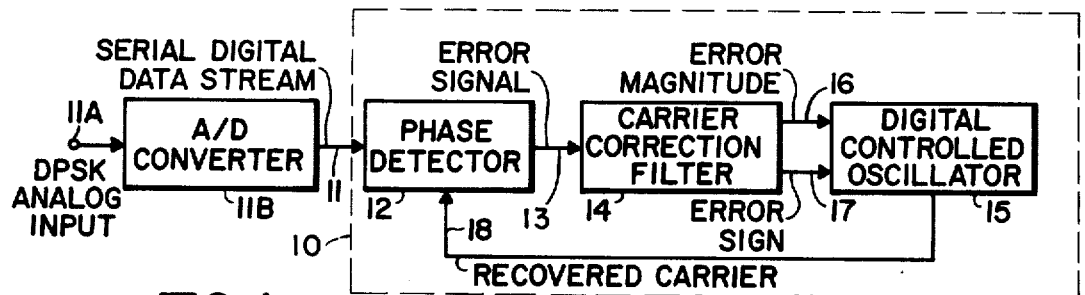
FIG. 1 is a block diagram of a preferred embodiment of the invention.

Referring to FIG. 1, carrier correction circuit 10, according to the invention, includes a phase detector circuit 12, a carrier correction filter circuit 14, and a digital controlled oscillator 15. Phase detector circuit 12 has an input 11 which receives a serial digital data stream of words having an underlying carrier frequency of 1800 Hertz plus or minus approximately 10 Hertz. The serial digital data stream is generated by an analog-to-digital converter 11B in response to a DPSK (differential phase shift keyed) analog input signal, such as shown in waveform A of FIG. 6, applied to input 11A. The A/D converter 11B samples the DPSK signal twelve times each dibit, such as at A, B, C of FIG. 6, generating sequentially a sign bit and 6 magnitude bits each time at node 11. The peaks and valleys of the DPSK waveform, such as points A and D may have their magnitudes represented by all "1's", while the crossover point C may have its magnitude represented by all "0's", and points between may have their magnitude represented by proportional numbers of "1's" and "0's". For a more complete description of a DPSK system and waveforms, see copending application Ser. No. 619,439, entitled "Digital Differential Phase Shift Keyed Modulation", filed Oct. 3, 1975, now U.S. Pat. No. 4,008,373 and incorporated by reference herein. Digital information is DPSK (differential phase shift keyed). Each word in the serial digital data stream includes a certain number of bits, for example, six magnitude bits and one sign bit. Phase detector circuit 12 has as additional inputs two representations of the recovered carrier. In a presently preferred embodiment, the recovered carrier is inputted to phase detector 12 via two conductors represented by line 18 in FIG. 1. The recovered carrier is inputted to phase detector 12 in two forms, one of them being shifted 90° from the other, so that the serial data input stream can be mixed, or Exclusive ORed with the two shifted versions of the recovered carrier, as explained hereinafter. As a result of the comparison of the recovered carrier with the serial data input stream, phase detector 12 generates an output error signal on conductor 13 which indicates simply whether the recovered carrier signal should be advanced or retarded in order to synchronize it with the incoming carrier frequency.

Figure 5:
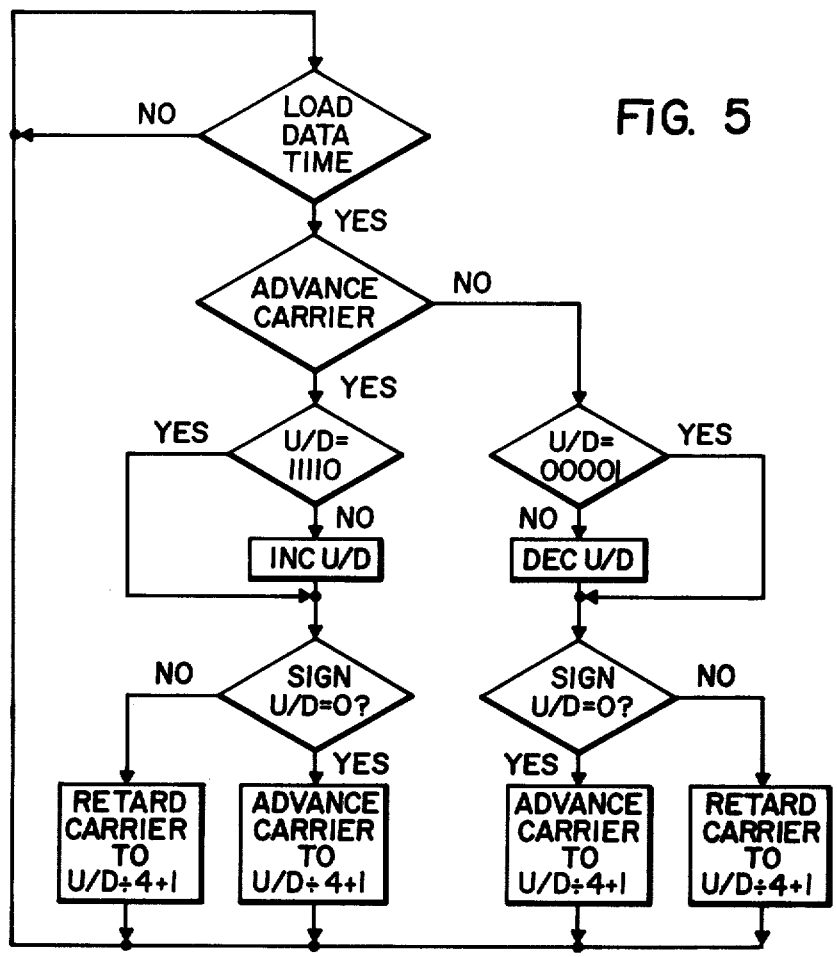
FIG. 5 is a flow chart of the algorithm implemented by the carrier correction circuit of FIG. 1.

Carrier correction filter circuit 14 receives the error signal on conductor 13 as an input, and generates as an output on conductor 16 a series of pulses, the number of which is indicative of the magnitude of the error between the incoming carrier frequency and the recovered carrier frequency, and generates another output signal representative of the direction (which the recovered carrier should be shifted) on conductor 17. The error signals on conductors 16 and 17 serve as inputs to digital controlled oscillator 15, which generates the two representations of the recovered carrier. (One delayed from the other by 90°.) The carrier correction circuit of FIG. 1 may be utilized in any kind of DPSK system in which the carrier frequency must be recovered and synchronized with the incoming signal carrier, and is especially useful in a DPSK demodulator for a modern system. The general algorithm indicated by the flow chart in FIG. 5 describes the general operation of the carrier correction circuit 10 of FIG. 1. More generally, the carrier correction circuit according to the invention is suitable for generating a recovered carrier from an independent clock source and synchronizing it to an underlying carrier frequency for any type of digital data input stream which has an underlying carrier frequency associated therewith.

An advantage of the circuit of the present invention is that it can be utilized to adjust the recovered carrier in a system requiring a recovered carrier synchronized to a digital data stream having an associated underlying carrier frequency, such as a DPSK demodulator. A carrier recovery circuit for a circuit which receives a DPSK input data stream has two basic requirements. First, it must be capable of phase adjustment to insure that the recovered carrier stays synchronized with the incoming signal carrier. The second is that the carrier correction circuit must also be capable of adjusting the recovered carrier frequency correction rate to compensate for frequency translation which can exist on the DPSK data carrier itself. Briefly, the operation is such that the incoming signal is fed into phase detector 12 of FIG. 1 which generates a signal carrier phase angle. This phase angle is compared to the recovered carrier and a resultant error signal is produced on conductor 13. The error signal on conductor 13 contains information indicating whether the recovered carrier needs to be advanced or retarded to bring it into synchronization with the underlying carrier of the serial digital data stream.

The carrier correction filter 14 is used to produce an averaging effect upon the error signal on conductors 13 and also provides increasing or decreasing amounts of recovered carrier correction to correspond to translation of incoming signal carrier frequency. The filtered error correction signal at conductor 16 controls the digital controlled oscillator which generates the recovered carrier. These error signals control the direction (i.e., advance or retard) and magnitude of corrections to the recovered carrier signals.

Figure 2:
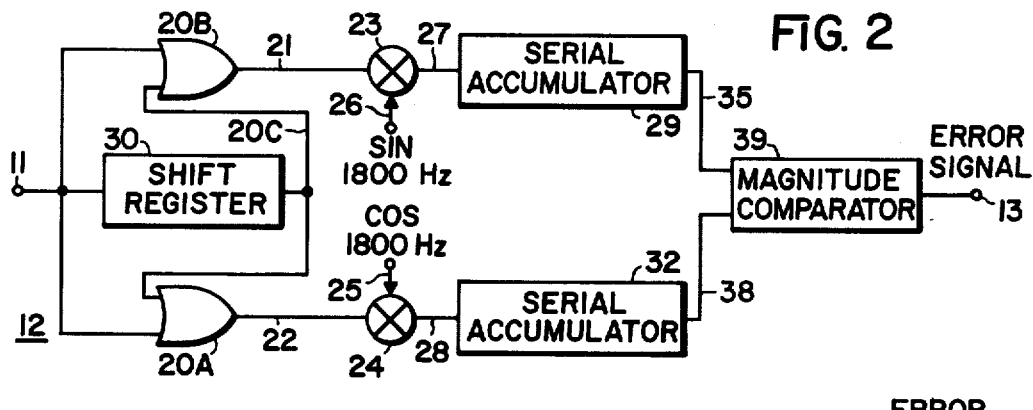
FIG. 2 is a detailed block diagram of the phase detector of FIG. 1.

FIG. 2 is a more detailed block diagram of phase detector 12 of FIG. 1. Phase detector 12 includes OR gates 20A and 20B having inputs connected to conductor 11 for receiving the digital data input stream. Shift register 30 is connected between conductor 11 and conductor 20C, which is connected to the other inputs of OR gates 20A and 20B. Two mixer circuits 23 and 24 receive the outputs of delay OR gates 20A and 20B, respectively via conductors 21 and 22, respectively. Conductor 26 presents a square wave signal designated as sine 1800 Hz as an input to circuit 23. Conductor 25 presents a square wave signal designated cosine 1800 Hz as an input to circuit 24. The cosine 1800 Hz signal is shifted in phase 90 degrees from the square wave signal on conductor 26.

(It has been established that the amount of phase shift of the square wave on conductors 25 and 26 needs to be very close to 90 degrees, and the performance falls off sharply as the phase shift between the two signals varies from 90 degrees.)

Mixer circuits 23 and 24 include Exclusive OR circuitry and timing circuitry, such that the net result at conductor 27 and 28 is the same as if the digital input data stream were rectified before a second data stream were generated by delaying the rectified data stream by 90 degrees, and the two data streams were applied to conductors 27 and 28, respectively.

The outputs 27 and 28 of circuits 23 and 24, respectively, are fed into a pair of serial accumulators 29 and 32, respectively. The outputs 35 and 38 of serial accumulators 29 and 33, respectively, are provided as inputs to a magnitude comparator circuit 39, which has an output conductor 13 whereon an error signal is generated every dibit.

Shift register 30, in conjunction with OR gates 20A and 20B, operate to add the complement of the data accumulated twelve sample times earlier into the mixers 23 and 24, in order that the two serial accumulators 29 and 32 maintain a running average accumulation over one dibit in time, instead of maintaining a continually increasing accumulation. Thus, each "word" of the serial input stream can be subtracted from the accumulations in 29 and 32 sample after being stored for twelve sampling times in shift register 30 before it is mixed in mixers 23 and 24 and then entered into the accumulators.

Figure 6:
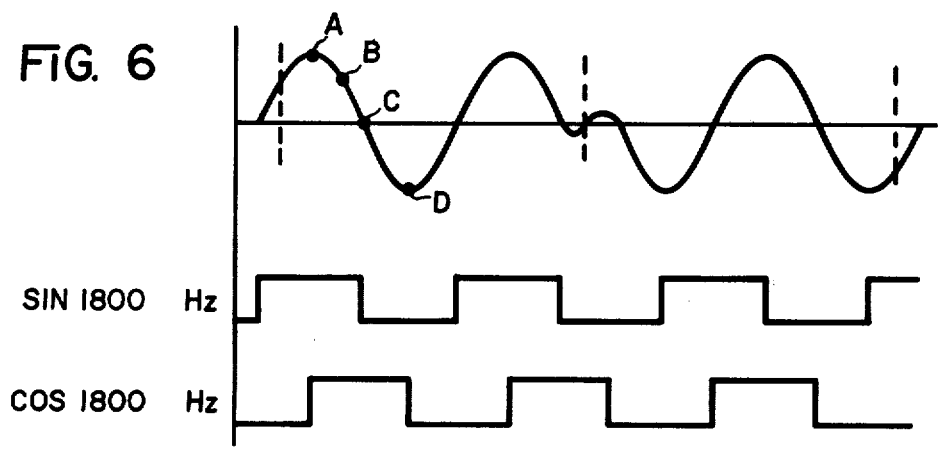
FIG. 6 is a diagram indicating a differential phase shift keyed input signal and two versions of the recovered carrier signal shifted 90° apart.

The output of the analog to digital converter consists of a sign bit plus a 6-bit magnitude word for each of the twelve times per dibit that the analog input of FIG. 6 is sampled. The peaks and valleys of the analog input are represented by all "1's", and the points at which the input cross the 0 axis are represented by all "0's", and points in between are represented by a proportionate number of "1's" and "0's". The purpose of the mixer, or exclusive OR circuits, 23 and 24 in FIG. 2 is to provide a result which is the same as it would be if the analog input was rectified, so that all of the magnitude bits of each word are accumulated by the two serial accumulators 29 and 32. The same affect could be accomplished if the analog input were passed through a full wave rectifier before being fed into the analog to digital converter. The overall function of phase detector 12 is to compare the digital data stream with the squarewave signals from conductors 25 and 26, which each represent the recovered carrier, to generate an error signal which determines whether the recovered carrier should be advanced or retarded to bring it in phase with the underlying carrier the digital data stream.

The overall purpose of the carrier correction circuit 10 is to obtain a stable, average carrier frequency which is in phase with the carrier of the incoming data stream so that the phase shifts of the incoming data stream representative of the binary data contained therein can be compared with the recovered carrier so that the "1's" and "0's" can be decoded as a result of the comparison. Those skilled in the art will appreciate that by accumulating the product of the incoming data stream with the sine 1800 and cosine 1800 signals, the sign of the difference between the two accumulations over a period of time is indicative of whether the recovered carrier needs to be advanced or retarded to bring it into phase with the carrier of the incoming data stream. If the magnitude of the accumulation in accumulator 29 (which might be referred to by those skilled in the art as the 0° eye) is smaller, and the signs of the magnitudes of both accumulator 29 and accumulator 32 (which would be referred to as the 90° eye) are the same (i.e., both positive or both negative), then the recovered carrier needs to be advanced. On the other hand, if the signs of the accumulation in accumulators 29 and 32 are opposite, the recovered carrier needs to be retarded. Circuitry can be readily implemented in magnitude comparator 39 to recognize these two conditions and implement the desired error signal to be produced on conductor 13. The objective of carrier correction circuit 10 is to achieve the right amount of advancing or retarding of the recovered carrier signal so that the contents of two serial accumulators 29 and 32 are equal at the times they are compared by the magnitude comparator 39. When the recovered carrier is in phase with the incoming data stream carrier frequency, the number of counts in each accumulator will be maximized.

To summarize, the two serial accumulators then present running totals, shifted and mixed by 90 degrees as indicated above, of the magnitudes of the data input stream mixed with or multiplied by the recovered carrier. If the recovered carrier is in phase with the input data stream the totals in the two accumulators over the same time period should be the same. If they are not in phase, the algebraic sign of the difference is indicative of whether the recovered carrier needs to be advanced or retarded in phase to bring it into phase with the carrier of the incoming data stream.

Figure 3:
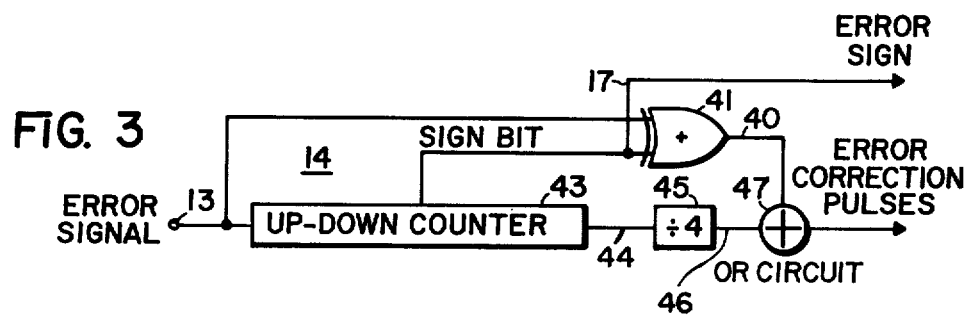
FIG. 3 is a detailed block diagram of the carrier correction filter of FIG. 1.

Referring to FIG. 3, carrier correction filter 14 has as an input conductor 13, on which the error signal output of phase detector 12 is generated. Carrier correction filter 14 includes an up/down counter 43 which produces an output on conductor 44. Conductor 44 serves as an input to divide-by-four circuit 45, which has an output conductor 46. Carrier correction filter 14 includes an Exclusive OR type circuit 41 which has as an input the error signal conductor 13 and has as another input the conductor 17 coupled to an output of the most significant bit of up/down counter 43. The signal on conductor 17 indicates whether the recovered carrier is to be advanced or retarded. The output of Exclusive OR type circuit 41 is produced on conductor 40. A circuit 47, which is substantially an OR-type circuit, receives signals on conductors 40 and 46 as inputs and has timing circuitry (not shown) which causes circuit 47 to produce an output every dibit on conductor 16 in the form of a series of pulses equal in number to the total number of pulses on conductors 40 and 46. The contents of up/down counter 43 divided by 4 is presented as a series of pulses at 46 every dibit. Every error pulse that appears on conductor 13 is fed through so it is entered into OR circuit 47 and added every dibit to the number of pulses on conductor 46 to produce the total number of error correction pulses every dibit on conductor 16.

The signal containing the number of error correction pulses on conductor 16 is an error correction signal, and is applied to digital controlled oscillator 15, which is described with reference to FIG. 4.

The accumulator in the correction filter, that is the up/down counter 43, just keeps adding, it is never reset. If there were no frequency translation, there would simply be a series of alternating "1's" and "0's" coming in at terminal 13, and up/down counter would hover around zero. The divide by 4 counter would prevent an output pulse from appearing on 46 unless at least 4 counts were accumulated in up/down counter 43. Therefore, the effect of divide-by-4 counter is to average the frequency translation error over a period represented by the time required for 4 counts to occur. This is what causes the averaging or filtering effect of the carrier correction filter 14. There will be one error pulse appearing at 46 every dibit for every 4 net positive error pulses accumulated in up/down counter 43 and received from magnitude comparator 39 in FIG. 2.

In a practical implementation, the divide by 4 counter 45 is simply a tapping off of the third significant bit of the up/down counter 43, and some associated timing circuitry (not shown).

Figure 4:
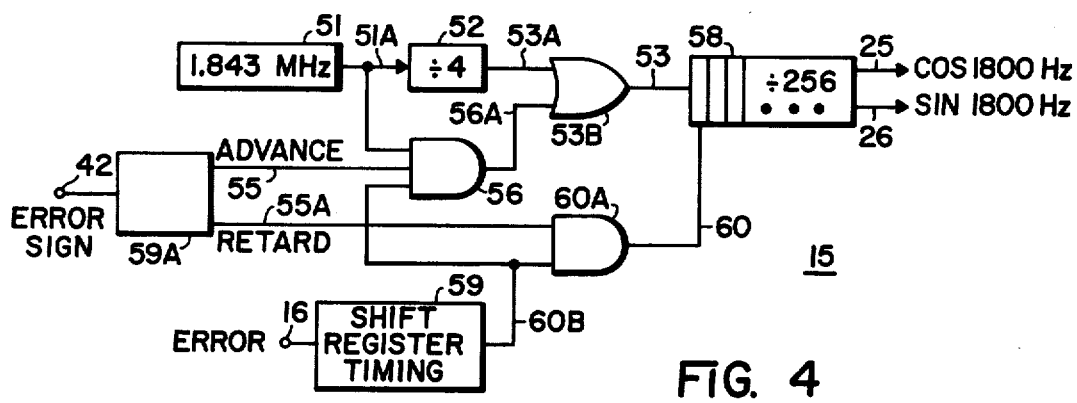
FIG. 4 is a detailed block diagram of the digital controlled oscillator of FIG. 1.

Referring to FIG. 4, digital controlled oscillator 51 receives as an input a 1.8432 MegaHertz clock signal, which is generated from source 51. The clock signal is provided on a conductor 51A which serves as an input to a divide-by-four circuit 52, which produces an output on conductor 53A, which is an input to OR gate 53B, which has conductor 53 as an output. Conductor 53 serves as an input to a divide-by-256 counter circuit 58. The conductor 51A from clock source 51 is also provided as an input to AND gate 56. Conductor 55, on which an advance signal is produced by circuit 59A, is an input to AND gate 56. The output of AND gate 56 is an input to OR gate 53B. Circuit 59A accepts an error correction signal on conductor 17 from the carrier correction filter 14, and also produces a retard signal on conductor 55A, which is an input to AND gate 60A, the output of which acts to inhibit the least significant bit of counter 58 in order to retard the phase of the recovered carrier signals on conductors 25 and 26. If an advance signal is present on conductor 55, the fast clock signal on conductor 51A is gated onto conductor 56A to advance the recovered carrier phase by the number of correction pulses stored in shift register 59 and shifted out of shift register 59 via conductor 60B to enable AND gate 56 and AND gate 60A. If a retard signal is present on conductor 55A, the least significant bit of counter 58 is inhibited by the number of counts stored in and shifted out of shift register 59.

The 90 degree phase difference between the sine 1800 and cosine 1800 version of the recovered carrier on conductors 25 and 26 is readily achieved by running the pulses from the output of the 256 bit counter through a shift register and tapping off at two different points which are 90 degrees apart.

The system described herein provides a smaller carrier correction factor when no frequency translation of the underlying carrier of the incoming serial digital data stream occurs, and provide for making larger corrections to the recovered carrier only when required because of large frequency translation. This technique requires a variable carrier correction factor which makes use of carrier correction direction "past history" over many dibits.

As an example, assume that one unit of carrier correction is equal to 1.4 degrees per dibit, and that the recovered carrier is in sync with signal carrier. If the incoming signal carrier of 1800 Hz is frequency translated to 1810 Hz, a phase difference of 3 degrees per dibit would occur. Assuming the correction process begins with the up/down counter 43 at zero, then the initial value of corrections will be 1.4 degrees per dibit. At this level of correction the corrected carrier will not be able to track with the incoming signal carrier. If after several corrections, the signal on conductor 17 is still in the "advance" state, this is an indication that the signal phase is running at a higher rate than the 1.4 degrees per dibit rate of corrections. After four consecutive advance commands, the contents of up/down counter 43 divided by four will be one. Adding to this the number of pulses on conductor 40 brings the total correction level to 2 times 1.4, or 2.8 degrees per dibit. If this level of correction is unable to cause a synchronization of the recovered carrier with the incoming carrier, the up/down counter 43 will continue to count up. After eight consecutive "advance" signals are received the value of the contents of up/down counter 43 divided by four will be two. Adding to this the FFE brings the total correction level to 3 times 1.4, or 4.2 degrees per dibit. This process continues until the recovered carrier has caught up to and actually exceeded the signal carrier phase. At this point, retard carrier commands will cause the up/down counter to count down. This process continues in a direction that reduces the recovered carrier phase. Eventually up/down counter 43 will oscillate between several counts at a value that represents an average level of corrections equal to 3 degrees per dibit which is the assumed incoming signal carrier phase rate of change in this example.

The timing logic has not been shown in FIGS. 1–4, but could readily be implemented by one skilled in the art to enable or effect the digital transfers indicated herein. The counters, gates, accumulators, etc. mentioned are all well known in the art, and suitable versions of them could be readily implemented by one of ordinary skill in the art.

What is claimed is:

1. A carrier correction circuit for producing a recovered carrier signal from a differential phase shift keyed input signal comprising:

first means responsive to said differential phase shift keyed input signal and to said recovered carrier signal for periodically producing an error signal indicative of whether said recovered carrier signal needs to be retarded or advanced in phase in order to synchronize it with said differential phase shift keyed input signal;

second means responsive to said error signal for cumulatively counting a number of advance and retard representations of said error signal and dividing the net number of advance and retard representations by an averaging factor to produce an averaged error signal representative of the magnitude of required correction to said recovered carrier signal and for producing a direction error signal indicative of whether said recovered carrier signal should be advanced or retarded in phase; and third means responsive to said averaged error signal and said direction error signal for generating said recovered carrier signal.

2. A carrier correction circuit for producing a recovered carrier signal from an input signal having a carrier frequency associated therewith comprising:

first means responsive to said input signal and to said recovered carrier signal for periodically producing an error signal indicative of whether said recovered carrier signal needs to be retarded or advanced in phase in order to synchronize it with said input signal;

second means responsive to said error signal for cumulatively counting a number of advance and retard signals of said error signal and dividing the net number of advance and retard signals by an averaging factor to produce an averaged error signal representative of the magnitude of required correction to said recovered carrier signal and for producing a direction error signal indicative of whether said recovered carrier signal should be advanced or retarded in phase; and third means responsive to said averaged error signal and to said direction error signal, and to a clock signal having a frequency independent of said carrier frequency for generating said recovered carrier signal and advancing or retarding the phase of said recovered carrier signal in accordance with said direction error signal by an amount determined by said average error signal.

3. The carrier correction circuit as recited in claim 2 wherein said first means includes:

fourth means responsive to said input signal and to the sine of said recovered carrier signal for producing a first sequence of digital signals representative of the exclusive OR of said input signal and said sine of said recovered carrier signal;

first accumulator means coupled to said fourth means for summing said first sequence of digital signals over a predetermined period of time;

fifth means responsive to said input signal and to the cosine of said recovered carrier for producing a second sequence of digital signals representative of the exclusive OR of said input signal and said cosine of said recovered carrier signal;

second accumulator means coupled to said fifth means for summing said second sequence of digital signals over said period of time;

comparator means for producing said error signal, said error signal being indicative of whether the contents of said first accumulator means is greater in magnitude than the magnitude of the contents of said second accumulator means.

4. The carrier correction circuit as recited in claim 2 wherein said second means includes:

up/down counter means responsive to said error signal for cumulatively periodically counting up when said error signal is a logical "one" and counting down when said error signal is a logical "zero";

fourth means coupled to a particular bit of said up/down counter means for periodically producing a first signal representative of the division of the contents of said up/down counter by a particular factor; and fifth means responsive to said first signal and to said error signal for producing, in sequence, a number of pulses equal to the total of the number of pulses of said first signal and the number of pulses in said error signal.

5. The carrier correction circuit as recited in claim 2 wherein said third means includes:

first counter means responsive to a clock signal for dividing said clock signal;

fourth means responsive to said direction error signal for producing an advance signal if said recovered carrier needs to be advanced and a retard signal if said recovered carrier needs to be retarded;

register means responsive to said average error signal for storing a number of units of phase shifting represented by said averaged error signal;

OR means responsive to said first counter means to said clock signal, to said register means, and to said fourth means for generating a counting signal which is increased by the number stored in said register means if said advance signal is a logical "one";

AND means responsive to said retard signal and to said register means for generating an inhibit signal for a number of counts represented by the contents of said register means if said retard signal is at a logical "one";

second counter means responsive to said OR means and said AND means for counting at a rate equal to the number of pulses generated by said OR means reduced by the number of inhibit pulses generated by said AND means, the output of said second counter means being representative of said recovered carrier.

6. The carrier correction circuit as recited in claim 5 wherein said second counter means includes means for generating two representations of said recovered carrier, one being shifted ninety degrees in phase from the other.

7. A carrier correction circuit for producing a recovered carrier signal from a differential phase shift keyed input signal having a carrier frequency associated therewith comprising:

first means responsive to said differential phase shift keyed input signal and to said recovered carrier signal for producing an error signal including one or more advance pulses if said recovered carrier signal needs to be retarded in order to synchronize it with said differential phase shift keyed input signal and including one or more retard pulses if said recovered carrier signal needs to be advanced in order to synchronize it with said differential phase shift keyed input signal;

second means responsive to said error signal for accumulating a number equal to the number of said advance pulses minus the number of said retard pulses of said error signal and dividing said number by an averaging factor to produce an averaged error signal representative of the magnitude of required correction to said recovered carrier signal and for producing a direction error signal indicative of whether said recovered carrier signal should be advanced or retarded in phase;

third means responsive to a clock signal having a frequency independent of said carrier frequency for generating said recovered carrier signals; and fourth means responsive to said direction error signal and said average error signal coupled to said third means for effecting conditionally retarding or advancing the phase of said recovered carrier signal an amount determined by said averaged error signal, conditioned on the direction indicated by said direction error signal.

* * * * *